Jan. 23, 1951     D. DE RYCKE     2,538,833
APPARATUS FOR DRYING OR CALCINING MATERIALS
Filed Aug. 3, 1948
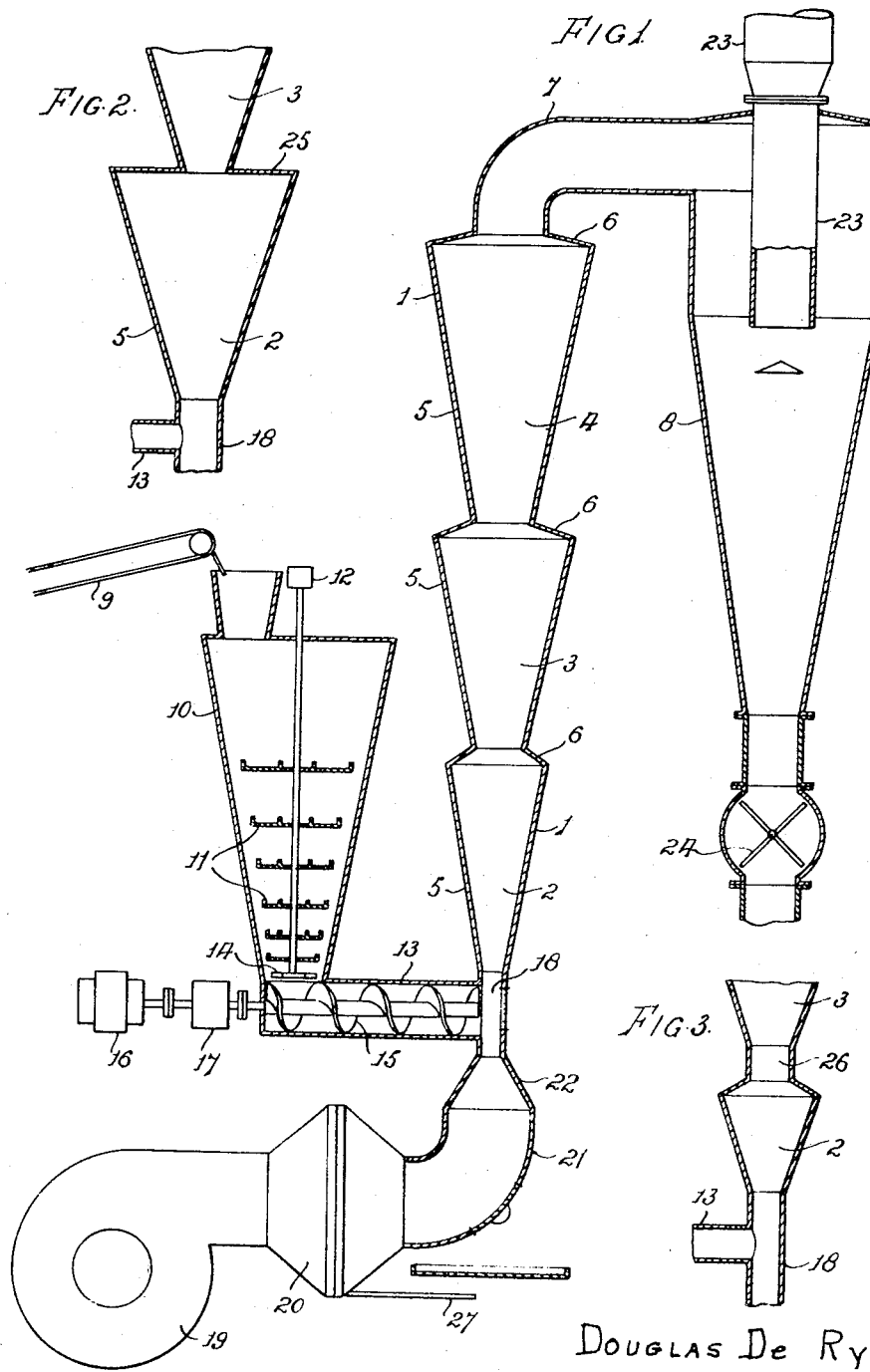
Douglas De Rycke
By
His Attorney Patented Jan. 23, 1951

2,538,833

UNITED STATES PATENT OFFICE 2,538,833

APPARATUS FOR DRYING OR CALCINING MATERIALS

Douglas De Rycke, Liverpool, England, assignor to Peter Spence & Sons Limited, Manchester, England Application August 3, 1948, Serial No. 42,297
In Great Britain August 13, 1947

2 Claims. (Cl. 34—57)

This invention has reference to drying or calcining apparatus of the kind comprising a drying or calcining column through which a rising stream of hot air or gas is passed, the material to be dried or calcined being fed into the bottom of the column and carried upwards therethrough to a settling or filter unit which separates the dried or calcined material from the air or gas.

The main object of the invention is to provide an improved apparatus of the kind referred to, for drying or calcining materials in the form of friable lumps or masses whereby to effect disintegration of the lumps or masses concurrently with drying or calcining. The improved apparatus is particularly suitable for drying or calcining powdered or granular materials, such as for example alum meal, which when wet bind or agglomerate into small lumps or masses.

According to the invention the drying or calcining column of an apparatus of the kind referred to, comprises at least one drying or calcining chamber gradually increasing in cross-sectional area from its lower end, into which the material to be treated is fed, to, or to near, its upper end where it is provided with a deflector wall for directing material which impinges thereagainst downwards into the rising stream of material, said wall having formed in it an exit. Preferably, the chamber comprises an inverted slowly divergent truncated cone whose inlet is at its truncated apex, surmounted by a rapidly convergent truncated cone whose exit is at its truncated apex. Also, preferably, the drying or calcining column comprises a plurality of chambers superimposed so that the exit from one chamber opens to the entry to the chamber next above it.

In the accompanying drawings Fig. 1 is a diagrammatic elevation, mostly in section, of a drying or calcining apparatus comprising one embodiment of the invention, Fig. 2 is a fragmentary diagrammatic sectional elevation illustrating a modification, and Fig. 3 is a like view showing another modification.

Referring to Fig. 1, the drying or calcining column I of the apparatus consists of three chambers 2, 3 and 4 each of which chambers comprises an inverted slowly divergent truncated cone 5 the inverted truncated apex of which forms the inlet to the chamber, surmounted by a rapidly convergent truncated cone 6 the truncated apex of which constitutes the outlet from the chamber. The three chambers 2, 3 and 4 are superimposed so that the exits from the chambers 2 and 3 open directly to the inlets to the chambers 3 and 4, respectively. The outlet from the uppermost chamber 4 opens directly to a duct 7 leading to a cyclone separator 8 into the upper cylindrical part of which it opens tangentially in the usual way.

The cones of the chambers 2, 3 and 4 gradually increase in maximum or cross-sectional area and length or height. The inlets and outlets from the chambers also gradually increase in cross-sectional area and the outlet from each chamber is not less, but is preferably slightly larger, in cross-sectional area than the inlet to the chamber.

The wet material (for example alum meal) to be dried or calcined is delivered by a suitably driven belt conveyor 9 into a hopper 10 fitted with a rotary agitator or rabble 11 (driven by an electric motor 12) which breaks up large pieces of material into smaller lumps and discharges the material into the casing 13 of a worm feeder, the discharge being controlled by a valve 14 on the lower end of the shaft of the agitator or rabble 11. The worm 15 of the feeder, driven by an electric motor 16 through a variable speed gear 17, feeds the material into a throat piece 18 at the inlet to the cone 5 of the lowermost chamber 2.

The drying or calcining and conveying medium (air or gas) is supplied by a fan 19, driven by an electric motor through a variable speed gear (not shown) to a heater 20 whence the heated medium is discharged into the lower end of the throat piece 18 by an elbow piece 21 and a connection 22 of tapering cross-sectional area. From the throat piece 18 the stream of hot air issues at a high velocity into the chamber 2. The heater 20 may conveniently comprise stream coils to which steam is conveyed by a pipe 27.

The material fed into the throat piece 18 is met by the stream of hot air or gas admitted into the lower end of the throat piece and discharged from the upper end of the throat piece at a high velocity into the lowermost chamber 2 of the column I. In the chamber 2 the velocity of the stream of hot air or gas and material is reduced as the cross-sectional area of the inverted cone 5 of the chamber increases and there is some tendency for helical flow to be induced in the cone.

By virtue of the decreased velocity of the stream of hot air or gas and material within the cone 5, the largest agglomerated masses of material float within the cone at levels depending upon the size of the masses and the specific gravity of the material during which floating masses are subjected to the drying action of the hot air or gas. Smaller masses, again depending on their size and the specific gravity of the material, are carried forward and thrown outwards and caused to impinge against the cone 6 and are thereby directed downwards and towards the centre of the chamber into the rising stream of material and floating masses which are thus subjected to bombardment by the deflected material and disintegrated or broken up. The smallest, and therefore driest, masses and single particles of material pass out from the chamber 2 into the intermediate chamber 3 where the action just described is repeated with further comminution of the partially dried agglomerated masses of material. From the chamber 3 the material passes into the uppermost chamber 4 wherein the action is again repeated and comminution and drying completed. From the chamber 4 the stream of air or gas and now disintegrated dry material passes by way of the duct 7 to the cyclone separator 8, wherein the air or gas is separated from the material and exhausted through the usual outlet 23, the material settling in the lower inverted conical lower part of the separator from which it is removed by means of a rotary valve 24.

The general effect within each of the chambers 2, 3 and 4 is one of great turbulence with the floating and rising masses of material being disintegrated as a result of the fragmenting effect of the downwardly deflected masses combined with the drying or calcining action of the hot air or gas. The overall drying or calcining efficiency of the chamber is increased by virtue of the increased area of the material exposed to the hot air or gas as a result of the disintegration of the agglomerated masses. The effect within the chambers is comparable with that within an air-swept ball mill, the material acting as self-disintegrating balls, with the general turbulence and helical flow of the hot air or gas within the chamber simulating the normal rotary action of a ball mill.

According to the modification shown in Fig. 2 the inverted cones 5 of the drying chambers instead of being surmounted by cones 6 as aforesaid, are provided with flat or horizontal annular covers 25 which deflect downward material that impinges against them.

Instead of the superimposed drying chambers opening directly one into the other next above it as in Figs. 1 and 2, adjacent chambers may be spaced from each other and connected together by lengths of ducting 26 as exemplified in the modification shown in Fig. 3.

A drying or calcining column may comprise only a single drying or calcining chamber as described or it may comprise any desired plurality of chambers.

The vertical height and maximum cross-section area of the cone or cones of the chamber or chambers may be varied according to the physical properties of the material to be treated. In the case of a column comprising a plurality of superimposed chambers, the chambers will preferably be of progressively increasing height as shown in Fig. 1.

Since the stream of material and hot air or gas is forced through the chambers by the fan 19 the chambers 2, 3 and 4 operate at a pressure above atmospheric pressure. By coupling the suction of the fan to the separator outlet 23 and opening its delivery to exhaust, the stream of material and hot air or gas will be drawn through the chambers which will then operate under a sub-atmospheric pressure.

I claim:

1. A drying apparatus comprising a plurality of superimposed communicating chambers each consisting of an inverted truncated cone the apex of which constitutes the inlet to the chamber and the base of each chamber having an axial outlet and each outlet below the topmost being in direct communication with the apex of the chamber immediately above it, the chambers being of successively increased height and maximum cross-sectional area and their inlets and exits being of successively increased cross-sectional area, means for delivering gas under pressure to the inlet of the bottom chamber, means for delivering material to be treated into the bottom inlet, and a separator communicating with the outlet of the top chamber.

2. A drying apparatus according to claim 1 in which the base of each conical chamber is provided with an annular cover forming a partial closure to the base and having the wall about its central opening connected with the wall of the passage immediately above it.

DOUGLAS DE RYCKE.

REFERENCES CITED

The following references are of record in the file of this patent:

UNITED STATES PATENTS

| Number | Name | Date |
| --- | --- | --- |
| 748,894 | Trump | Jan. 5, 1904 |
| 1,459,326 | Dow | June 19, 1923 |
| 1,866,744 | Barthelmess | July 12, 1932 |
| 2,068,077 | Rosin | Jan. 19, 1937 |
| 2,435,927 | Manning et al. | Feb. 10, 1948 |